2,856,447

ADDITION AGENT FOR BATTERY PASTE

John E. Buskirk and Gilbert F. Hole, Muncie, Ind., assignors to General Motors Corporation, Detroit, Mich., a corporation of Delaware No Drawing. Application October 13, 1955
Serial No. 540,328

2 Claims. (Cl. 136—26)

This invention relates to storage batteries and is particularly concerned with addition agents used in connection with the positive plates thereof.

It is the main object of the invention to provide an addition agent for the positive plate paste of a Faure type storage battery which addition agent improves the strength of the plate paste thereby making the completed plate more rugged and serviceable.

In carrying out this object it is a further object to use a small quantity of sodium perborate in the positive plate mix addition agent upon final curing of the plate with the paste therein causes the plate paste to be extremely hard and resistant to shatter.

A still further object of the invention is to utilize sodium perborate as an addition agent for use in the positive plate paste wherein the sodium perborate is utilized in quantities up to .2% by weight of the plate paste.

Further objects and advantages of the present invention will be apparent from the following description.

In the manufacture of storage batteries of the Faure type, problems are experienced in the handling of the storage batteries due to the fact that the positive plate paste after curing tends to crack and flake. This cracking and flaking off of the positive plate paste may be attributed to the extreme brittleness of the plate paste after curing so that when the plates are being handled prior to assembly in the battery, the plate paste becomes cracked and its adherence to the battery grid is reduced whereby after assembly of the plates in cell groups within the battery, the plate paste is fragile and poorly adhered in spots so that the cracked portions of the plate paste are easily dislodged during use and/or rough handling. This condition is highly undesirable since it not only reduces the capacity of the plate due to reduction of active material thereon but also may cause a shorting out of the cell if the sludge deposit becomes sufficiently great. In any event it is a known fact that positive plate pastes are brittle and do not present any appreciable resistance toward shatter when handled in the normal manner during the manufacture, assembly and use of the batteries.

This invention is directed to an addition agent which may be added to the plate paste during a preliminary mixing step and which upon curing of the plate paste on the battery grid imparts thereto a high degree of strength and resistance toward shatter. In this manner the plate paste remains intact upon the plate during assembly of the cell groups and the plates after assembly within the battery are more rugged whereby the life and efficiency of the battery are increased.

We have no explanation why this material functions as it does but we have found, through repeated tests, that positive plate pastes having incorporated therein small quantities of sodium perborate present a more rugged material which withstands rough handling, shocks and jars and which improves the overall characteristics of the battery.

Specifically we propose to add sodium perborate in a quantity of not in excess of .2% by weight wherein the quantity may be as low as 0.1% and still yield greatly improved results. The sodium perborate addition is made to the first water during the mixing of the plate paste. In this connection it is believed that the addition of sodium perborate changes the crystal structure of the red PbO lattice as determined by X-ray defraction pattern. There seems to be no change in the patterns of the other ingredients.

For illustrative purposes the following mixing procedure of a typical positive plate paste mix is set forth. 125 pounds of Barton litharge, which comprises a mixture of red litharge, yellow litharge and metallic lead, is mixed with nine liters of water and from 25 to 75 grams of sodium perborate. At this time a small quantity of a suitable wetting agent may be used if desired. These ingredients are mixed for about five minutes after which 3.24 liters of 1.395 specific gravity sulphuric acid is added over a five minute period and the mixing is continued for an additional five minutes. Finally 25 pounds of red lead are added with an additional five minute mixing period after which the positive plate mix as formed may be adjusted to a desired plasticity in the order of 270 to 280. This plate paste is then pasted onto storage battery grids and is suitably cured.

Procedures for making positive plate pastes from Barton litharge are clearly set forth in Patent No. 2,481,218 which also discloses curing techniques. Curing procedures are also disclosed in Patent No. 2,553,192 and Patent No. 2,656,399, both of said patents being assigned to the assignee of the present invention.

The ruggedness of the plate may be determined by a drop test wherein pasted and cured plates are dropped a distance of three feet onto a flat metal surface at an angle of less than 10°. The ruggedness of the plate paste may be determined by the number of one-half pellets dislodged during the drop test. Standard plates without the sodium perborate addition lost on an average of twenty half pellets while plates wherein the paste included .1% sodium perborate lost six one-half pellets and plates having paste containing .2% sodium perborate lost only three one-half pellets. All of said figures are averages of a plurality of plates tested. The use of sodium perborate in quantities in excess of .2% did not appear to further improve the ruggedness of the plate paste. The pellets referred to are shown in Patent No. 2,690,464 wherein a pellet may be described as the paste which is disposed in one of the partitions between the grid wires. It will also be noted that this paste is interlocked by the cross sectional shape of the wires so that one-half a pellet may be designated as the paste on one side of a partition formed by a grid wire.

From these test figures it is apparent that the inclusion of a small quantity of sodium perborate in the positive plate paste improves the strength and ruggedness of the plates considerably whereby the rejection of plates for fragility is reduced and improvement in the overall operation of batteries subsequently manufactured using the plates is improved.

While the forms of embodiment of the invention as herein disclosed constitute preferred forms, it is to be understood that other forms might be adopted, as may come within the scope of the claims which follow.

What is claimed is as follows:

1. The positive plate for a Faure type storage battery comprising, a grid pasted with a mixture of yellow and red litharge, red lead and metallic lead and including sodium perborate therein in quantities of from .1% to .2% by weight of the paste for making the plate paste rugged, strong and adherent to the grid.

2. A battery plate paste for use in the positive plate of a lead-acid storage battery, including as an addition agent sodium perborate in quantities of from .1% to .2% by weight of the paste.

References Cited in the file of this patent

UNITED STATES PATENTS

| | | |
|---|---|---|
| 1,437,343 | Howard | Nov. 28, 1922 |
| 1,798,287 | Ward | Mar. 31, 1931 |
| 1,919,000 | Wernlund | July 18, 1933 |